Oct. 4, 1927.
J. F. MacINDOE
1,644,343
PRESSURE LUBRICATOR
Filed Jan. 11, 1927
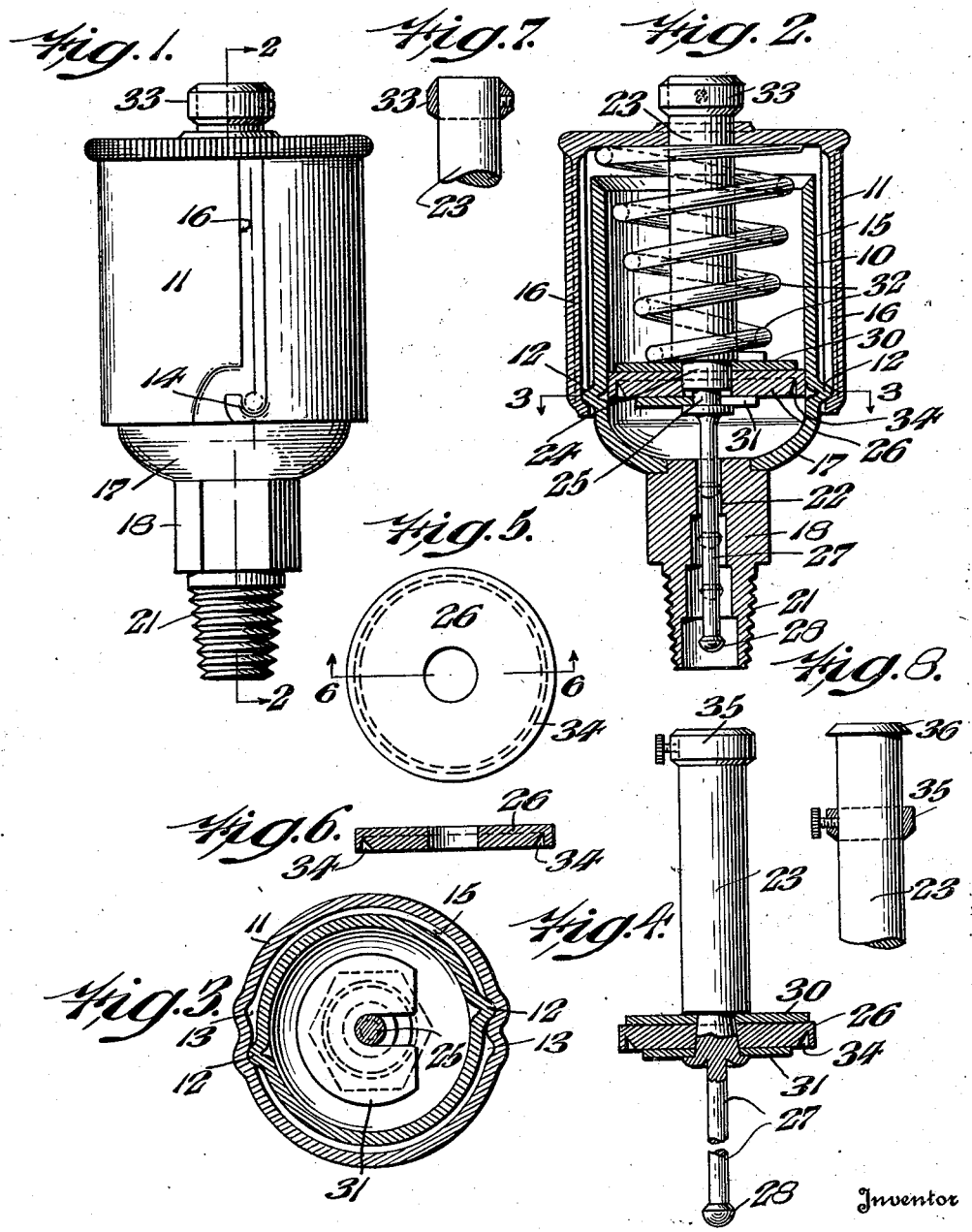
Inventor
JOHN F. MACINDOE,
By Robert M. Barr,
Attorney Patented Oct. 4, 1927.

1,644,343

UNITED STATES PATENT OFFICE.

JOHN FRANKLIN MacINDOE, OF PHILADELPHIA, PENNSYLVANIA.

PRESSURE LUBRICATOR.

Application filed January 11, 1927. Serial No. 160,389.

The present invention relates to grease cups and pressure actuated lubricators of the general type disclosed in Patents Nos. 1,263,843 and 1,383,181, and relates more particularly to a multi-stage lubricator.

Some of the objects of the present invention are to provide an improved lubricator of the cup type; to provide a lubricator of the spring pressure operated type having a means for automatically compensating for the diminishing pressure of the spring during the operation of the lubricator; to provide means for eliminating the resistance to the flow of lubricant from a pressure actuated lubricant cup; to provide for the successive expansion of a lubricant as it is discharged from a lubricating cup; to provide an improved means for preventing leakage past the piston of a pressure actuated lubricator; and to provide other improvements as will hereinafter appear.

In the accompanying drawings, Fig. 1 represents a side elevation of a lubricator embodying one form of the present invention; Fig. 2 represents a section on line 2—2 of Fig. 1; Fig 3 represents a section on line 3—3 of Fig. 2; Fig. 4 represents a detail, in part section of the plunger and its adjuncts; Fig. 5 represents a plan of the plunger washer; Fig. 6 represents a section on line 6—6 of Fig. 5; Fig. 7 represents a detail of the upper end of the plunger; and Fig. 8 represents a modified form of the upper end of the plunger.

Referring to the drawings, one form of the present invention consists of a cup body 10 arranged in telescopic relation with a cap closure 11 which corresponds generally in length to the length of the body 10. Thus in assembled condition the body 10 has its sides and open ended top enclosed by the cap closure 11, the two parts being connected by a bayonet type of joint formed by outwardly pressed lugs 12 on the body 10 and slots 13 leading to seats 14 of the cap closure 11. Preferably also the body 10 and cap 11 have diameters designed to provide a clearance space 15 between the two and communicating with two vertically located vent grooves 16 which open respectively at their lower ends into the slots 13. These grooves 16 thus provide a discharge for any lubricant which, through leakage or otherwise, becomes trapped between the body 10 and the cap 11. The bottom 17 of the cup 10 is of concave contour and carries an axially disposed discharge fitting 18 having a threaded portion 20 for attachment to the part to be lubricated, or to a conduit carrying the lubricant to such part.

In order to discharge the lubricant from the cup 10, the fitting 18 has a bore 22 extending therethrough, and in the present construction this bore 22 is divided into lengths of varying diameter, the arrangement being such that the bore 22 increases by successive stages. Thus the lubricant enters the bore 22 at the stage of smallest diameter and leaves by the stage of greatest diameter, while the intermediate stages are all larger than the first but smaller than the last stage.

For discharging the lubricant from the cup 10 and controlling such discharge in a predetermined manner, a plunger rod 23 is provided which has a bearing for sliding movement through the cap 11 at its upper end while its lower end is of reduced diameter, as shown at 24 and 25 to receive a piston 26, and terminates in an extension 27 provided with a head 28. The head 28 is in the nature of a control valve because its diameter is proportioned with respect to the discharge bore 22, so that the amount of lubricant discharged around the head 28 when in the smallest stage position can be accurately gauged. The piston 26 is of the leather type and is held fast to the rod 23 by washers 30 and 31 which rigidly clamp the piston 26 between the shoulders of the reduced parts of the rod. A coil spring 32 is compressed between the piston 26 and the end of the cap 11 and the piston stroke can be regulated by a collar 33 adjustably held on the projecting end of the rod 23. The piston 26 is automatically pressed against the wall of the cup 10 by the pressure of the lubricant acting against a circumferential groove 34 provided in the bottom face of the piston.

In Figs. 7 and 8 a modified form of stroke adjustment is provided by an adjustable collar 35 on the rod 23 and which is limited by a circumferential lip 36 formed on the end of the rod 23. This collar 35 also serves by its position with respect to the top of the cap closure 11 to indicate the quantity of lubricant in the cup 10.

In using the device of the present invention, the cup 10 is filled with lubricant and inserted within the lower end of the cap 11 where it receives the piston 26 and is forced upward to compress the spring 32 until the lugs 12 enter the slots 13 so that the cap 11 can be turned to bring the lugs 12 upon the seats 14 and thus lock the cap 11 and cup 10 together. This places the spring 32 under compression and locates the head 28 in the smallest part of the bore 22. The device is now ready for use and when the discharge nipple 18 is threaded into the part to be supplied with lubricant, the grease will begin to feed under the pressure of the expanding spring but this feed will be only at the predetermined rate due to the proportioning of the head 28 with respect to the bore of smallest diameter. Under the feeding action the head 28 reaches the first expanding stage and the reduced pressure of the spring is then automatically compensated by the increased area of the bore so that the actual feed discharge continues at the same predetermined rate. This continues in successive stages until the piston 26 reaches the end of its travel. Thus the flow of lubricant takes place without resistance and at a rate which supplies just the desired amount of lubricant for the purposes intended.

While only a single form is shown in which this invention may be embodied, it is to be understood that the invention is not limited to any specific construction, but might be applied to various forms without departing from the spirit of the invention or the scope of the appended claim.

Having thus described my invention, I claim:

A lubricator comprising in combination a cup having a stepped discharge bore to increase the discharge area by stages from said cup to the outlet, a cap for said cup, a spring pressed piston between said cap and said cup and bearing upon lubricant in said cup and an extension connected to said piston having a head located in said bore.

Signed at Philadelphia, county of Philadelphia, State of Pennsylvania, this 27th day of December, 1926.

JOHN FRANKLIN MacINDOE.